(12) United States Patent
Onose et al.

(10) Patent No.: US 9,381,665 B2
(45) Date of Patent: Jul. 5, 2016

(54) CHAINSAW

(71) Applicant: HITACHI KOKI CO., LTD., Tokyo (JP)

(72) Inventors: Miyoji Onose, Hitachinaka (JP); Kouji Sagawa, Hitachinaka (JP); Satoru Matsuno, Hitachinaka (JP); Yasuo Etou, Hitachinaka (JP); Ai Nakayama, Hitachinaka (JP); Yasutaka Shimizu, Hitachinaka (JP)

(73) Assignee: HITACHI KOKI CO., LTD., Tokyo (JP)

( * ) Notice: Subject to any disclaimer, the term of this patent is extended or adjusted under 35 U.S.C. 154(b) by 62 days.

(21) Appl. No.: 14/378,648

(22) PCT Filed: Feb. 12, 2013

(86) PCT No.: PCT/JP2013/000736
§ 371 (c)(1),
(2) Date: Aug. 13, 2014

(87) PCT Pub. No.: WO2013/121768
PCT Pub. Date: Aug. 22, 2013

(65) Prior Publication Data
US 2015/0321377 A1    Nov. 12, 2015

(30) Foreign Application Priority Data

Feb. 13, 2012 (JP) .................. 2012-027922

(51) Int. Cl.
*B27B 17/12* (2006.01)
*B23D 57/02* (2006.01)
*B27B 17/00* (2006.01)

(52) U.S. Cl.
CPC .............. *B27B 17/12* (2013.01); *B23D 57/023* (2013.01); *B27B 17/00* (2013.01)

(58) Field of Classification Search
CPC ....... B27B 17/00; B27B 17/12; B23D 57/023
See application file for complete search history.

(56) References Cited

U.S. PATENT DOCUMENTS 3,763,962 A * 10/1973 Gottlieb .................. B27B 17/12
                                                              184/15.2
3,967,698 A * 7/1976 Smith ..................... B27B 17/12
                                                              184/15.2
(Continued)

FOREIGN PATENT DOCUMENTS

DE     20308275 U1    8/2003
DE     20316483 U1    3/2005
(Continued)

OTHER PUBLICATIONS

Notification of the First Office Action Chinese Patent Application No. 2013800091540 dated Jul. 17, 2015 with English translation.
(Continued)

*Primary Examiner* — Hwei C Payer
(74) *Attorney, Agent, or Firm* — McDermott Will & Emery LLP

(57) ABSTRACT

A chainsaw in which a remaining amount of chain oil to be supplied to a saw chain can be easily checked is provided. In a chainsaw 1 including: a saw chain 6 driven by a motor embedded in a main body; and an oil tank 11 in which the chain oil to be supplied to the saw chain 6 in wood cutting process is stored, an illumination unit (LED 15) is provided in vicinity of the oil tank 11. In this manner, the chain oil of the oil tank 11 positioned on a left side of the LED 15 can be illuminated. This illumination unit is configured to be used also as an illuminating device for illuminating the vicinity of the saw chain 6, that is, an area indicated by dotted lines from 21*c* to 21*d*. According to the present invention, in a dark location, the remaining amount of the chain oil can be checked, and besides, a positional relationship among the chainsaw 1 main body, the saw chain 6, and the periphery thereof can be easily visually checked, so that the working efficiency can be improved.

10 Claims, 9 Drawing Sheets

(56) References Cited

U.S. PATENT DOCUMENTS

| | | | | |
|---|---|---|---|---|
| 4,094,382 | A * | 6/1978 | Lee | B27B 17/12 123/196 CP |
| 4,353,163 | A * | 10/1982 | Overbury | B27B 17/12 137/543.13 |
| 4,393,589 | A * | 7/1983 | Barkhult | B27B 17/00 30/381 |
| 5,718,050 | A | 2/1998 | Keller et al. | |
| 8,134,780 | B2 * | 3/2012 | Ominato | G02B 19/0028 359/599 |
| 8,226,275 | B2 * | 7/2012 | Ieda | H04B 10/1141 362/311.01 |
| 2005/0188551 | A1 | 9/2005 | Magnuson et al. | |
| 2005/0248933 | A1 * | 11/2005 | Chen | B25B 23/18 362/119 |
| 2008/0087080 | A1 * | 4/2008 | Gwosdz | F01M 11/0004 73/323 |
| 2008/0247153 | A1 * | 10/2008 | Groover | F21V 23/04 362/23.1 |
| 2008/0314338 | A1 | 12/2008 | Gorenflo et al. | |
| 2009/0100689 | A1 * | 4/2009 | Shimokawa | B27B 17/0033 30/381 |
| 2011/0162219 | A1 * | 7/2011 | Okouchi | B25F 5/02 30/383 |
| 2012/0030954 | A1 * | 2/2012 | Heinzelmann | B27B 17/12 30/381 |
| 2014/0037482 | A1 * | 2/2014 | Hirai | B27B 17/12 417/500 |
| 2014/0047722 | A1 * | 2/2014 | Onose | B27B 17/00 30/383 |
| 2015/0321377 | A1 * | 11/2015 | Onose | B27B 17/00 30/383 |
| 2015/0336288 | A1 * | 11/2015 | Hallendorff | B27B 17/12 30/383 |

FOREIGN PATENT DOCUMENTS

| | | |
|---|---|---|
| DE | 20 2007 017 548 U1 | 7/2008 |
| DE | 10 2008 000 514 A1 * | 9/2009 |
| EP | 0 753 722 A2 | 1/1997 |
| JP | 60-184602 U | 12/1985 |
| JP | S6134308 A | 2/1986 |
| JP | H09-61224 A | 3/1997 |
| WO | WO 2013/159806 A1 * | 10/2013 |

OTHER PUBLICATIONS

International Search Report issued in International Application No. PCT/JP2013/000736 with Date of mailing May 8, 2013, with English Translation.

* cited by examiner

US 9,381,665 B2

CHAINSAW

TECHNICAL FIELD

The present invention relates to a chainsaw having an oil tank in which chain oil to be supplied to a saw chain is stored, and, more particularly, the present invention relates to a chainsaw in which a remaining amount in the oil tank can be easily checked.

BACKGROUND ART

A chainsaw is an automatic saw that is designed so that a saw chain formed in a chain shape is rotated by a driving source such as an electric motor or an engine to cut an object, and is widely used at a working site in the forest industry and the landscape industry. Since the saw chain is held by a guide bar, and is rotated in a state that the saw chain is in contact with the guide bar, and therefore, chain oil serving as lubricating oil used for reducing friction is supplied to the saw chain. As described in Patent Literature 1, a remaining amount of the chain oil can be visually checked by a worker through an observation window for checking the chain oil, which is provided in a housing of the chainsaw. The chainsaw is used outdoors in most cases, and therefore, the worker is forced to work in a dark location under a poor visibility in some cases depending on working environment and weather. In such a case, the worker sometimes hardly visually checks the remaining amount of the chain oil to be supplied to the saw chain, and therefore, sometimes illuminates the observation window with the light to check it.

CITATION LIST

Patent Literature

PTL 1: Japanese Utility-Model Application Laid-Open Publication No. S60-184602

SUMMARY OF INVENTION

Technical Problem

Separate preparation of illuminating means such as the light in order to check the remaining amount of the chain oil in the dark place requires the worker a cost burden, and also requires the worker to carry not only the chainsaw but also the light and others in accordance with the movement of the worker, and therefore, the working with always carrying them lays a heavy burden on the worker.

The present invention has been made in consideration of the above-described background, and a preferred aim thereof is to provide a chainsaw that is designed so that a remaining amount of an oil tank can be easily checked even in a dark location such as night and nightfall.

Solution to Problem

The features of typical aspects of the invention disclosed in the present application will be explained as follows.

A chainsaw according to one embodiment includes: a saw chain driven by a driving source housed inside a housing; a guide bar attached to the housing so as to protrude forward, which guides the rotation of the saw chain; and an oil tank housed inside the housing, in which a chain oil to be supplied to the saw chain is stored, and the oil tank is made of a transparent or semi-transparent material, the oil tank is provided so that at least a part thereof is visually checkable from outside of the housing, and an illumination unit for illuminating the oil tank is provided.

Advantageous Effects of Invention

According to the present invention, the remaining amount of the chain oil can be easily visually checked even in the dark location because the illumination unit for illuminating the oil tank is provided, and therefore, the working efficiency can be improved.

The above and other preferred aims and novel characteristics of the present invention will be apparent from the description of the present specification and the accompanying drawings described below.

DESCRIPTION OF EMBODIMENTS

Embodiment 1

Figure 1:
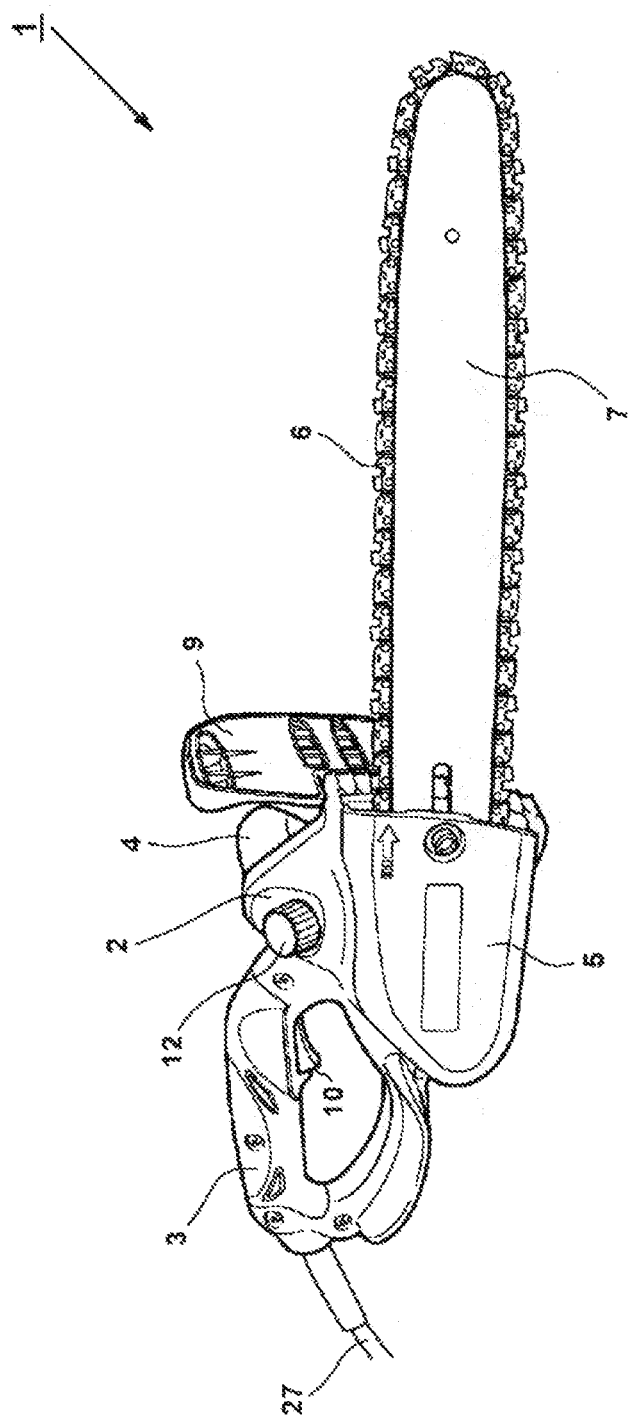
FIG. 1 is a perspective view illustrating appearance of a chainsaw 1 according to an embodiment of the present invention.

Hereinafter, embodiments of the present invention will be explained with reference to the drawings. Note that, in the following drawings, the same portions are denoted by the same reference symbols, and the repetitive explanations thereof are omitted. Also, in the present specification, the explanations are made so that front/back, right/left, and top/bottom directions are indicated as directions illustrated in the drawings.

FIG. 1 is a perspective view illustrating an appearance of a chainsaw 1 according to the embodiment of the present invention. In the chainsaw 1, an electric motor is driven by using a commercial power source (for example, AC 100 V, 50 Hz) supplied by a power source cord 27 so that a saw chain 6 wound around a guide bar 7 is rotated. Principal components of the chainsaw 1 are housed inside a housing 2 made of resin, a main handle 3 to be held by the worker is provided on a rear side of the housing 2, and a sub-handle 4 is provided from an upper side of the housing 2 to a left side thereof. The guide bar 7 is attached to a right side surface of the housing 2, and is provided so as to extend from the housing 2 toward a front side. The attaching portion of the guide bar 7 to the housing 2 and a driving unit of the saw chain 6 are covered with a cover 5. Inside the housing 2, an oil tank (to be described later) is provided, the oil tank being used for storing a lubricating oil for reducing friction with the guide bar 7 caused in the rotation of the saw chain 6. An inlet to the oil tank is exposed from the housing 2 to the outside, and is sealed with an oil cap 12. Below the main handle 3, a switch 10 for rotating the saw chain 6 is provided.

The main handle 3 is a handle to be held by the worker with his/her right hand, and the sub-handle 4 is a handle to be held by the worker with his/her left hand. A hand guard 9 is provided on a front side of the sub-handle 4. The hand guard 9 has a function for protecting the hand of the worker from being hit with branches, cut objects, etc. Further, by tilting the hand guard 9 frontward, a brake (not illustrated) for stopping the rotation of the saw chain 6 can be activated.

Figure 2:
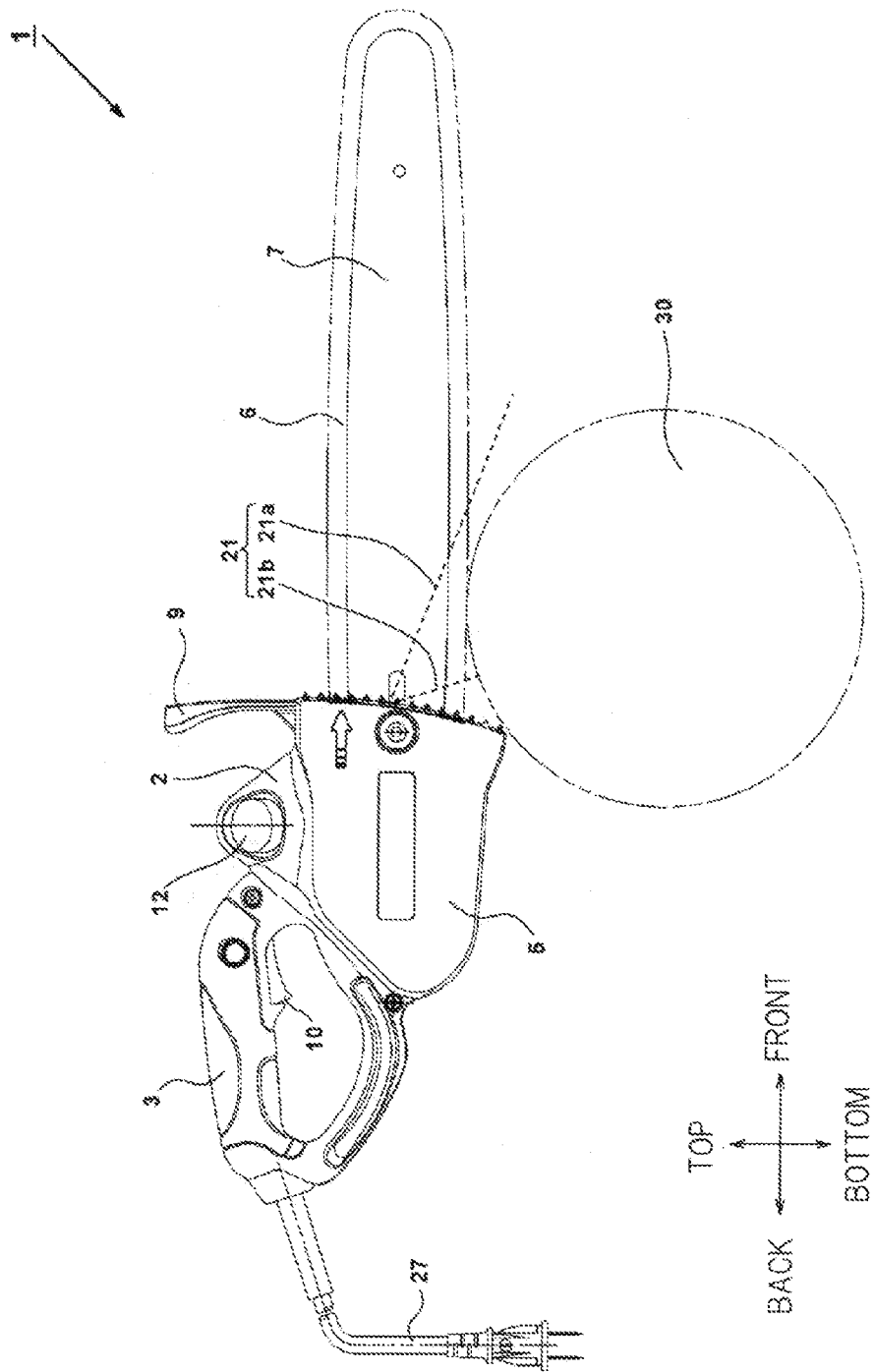
FIG. 2 is a right side view of the chainsaw 1 according to the embodiment of the present invention.

FIG. 2 is a right side view of the chain saw 1 according to the embodiment of the present invention. This drawing illustrates a state of the chainsaw 1 at the time of cutting a subject to be cut 30 such as log. The chainsaw 1 of the present embodiment includes an illumination unit (to be described later) based on an LED, and emitted light 21 thereof efficiently illuminates an area indicated from a dotted line 21a to a dotted line 21b. In the chainsaw having such a structure, the worker holds the main handle 3 and the sub-handle 4, and rotates the saw chain 6 at a high speed, so that a logging operation of trees or others is performed. The worker operates an LED switch (to be described later) to turn the LED on, if necessary.

Figure 3:
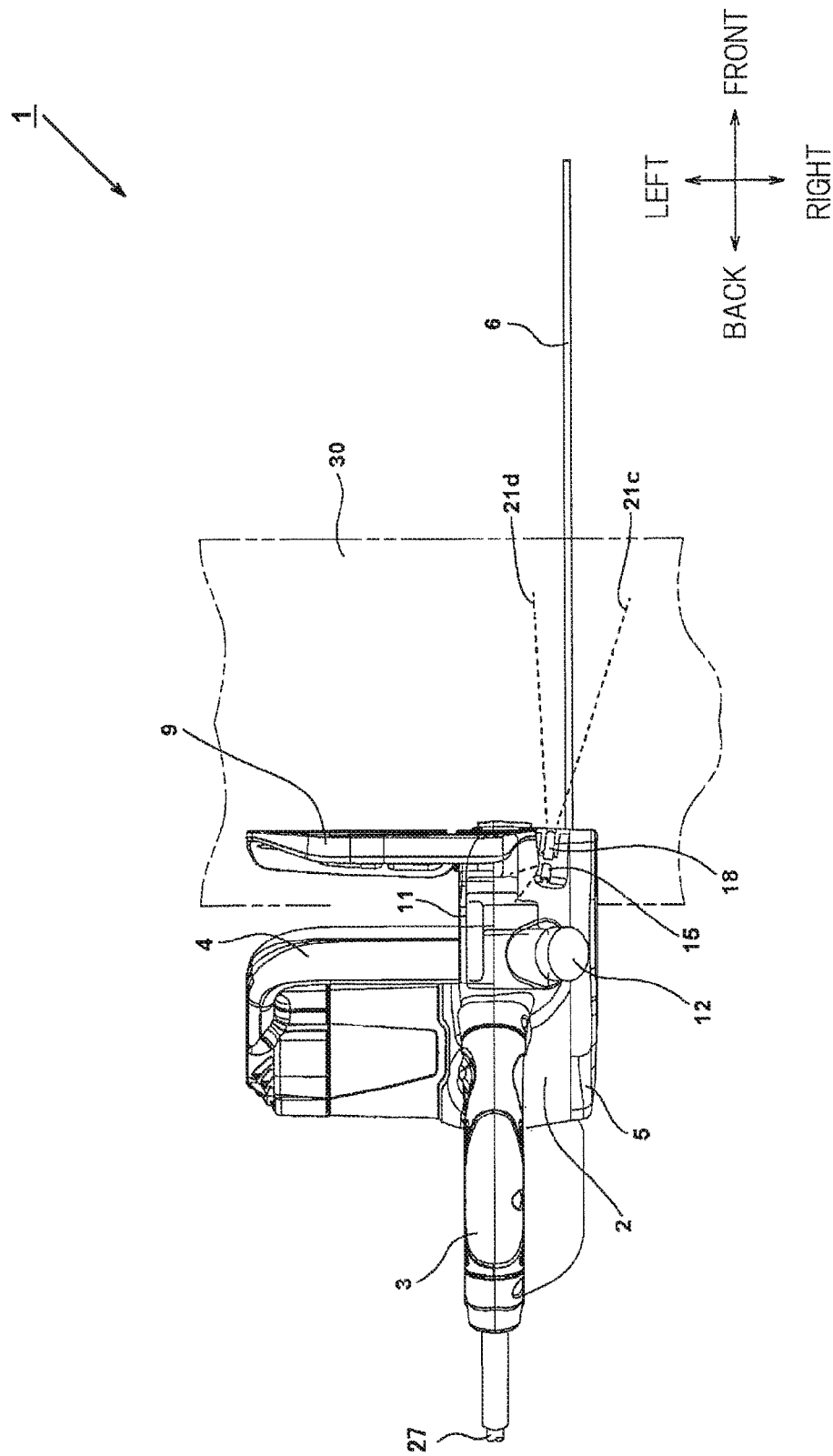
FIG. 3 is a top view of the chainsaw 1 according to the embodiment of the present invention, a part of which is illustrated as a cross-sectional view.

FIG. 3 is a top view of the chainsaw 1 according to the embodiment of the present invention, a part of which is illustrated as a cross-sectional view. A driving source of the chainsaw 1 of the present embodiment is a motor which is driven by an AC power source but is no illustrated. Although not illustrated in the drawings, in the motor, a rotary shaft thereof is arranged in a perpendicular direction (the right/left direction) with respect to a rotational plane (plane extending in the front/back and top/bottom directions), and the motor is covered with a motor cover unit 2d extending from the housing 2. The sub-handle 4 has a shape extending in the right/left direction from a left end of the motor cover 2d to an upper portion of the housing 2, and is fixed to the motor cover unit 2d and the housing 2 with a screw or others. In the present embodiment, one LED 15 serving as the illumination unit is provided inside the housing 2. A prism 18 is provided on a front side of the LED 15 so that light emitted from the LED 15 is guided by the prism 18 and is emitted onto the saw chain 6 side outside the housing 2. The light guided by the prism 18 is emitted so as to spread in an area from a dotted line 21c to a dotted line 21d. By the emission in this manner, the entire saw chain 6 and the subject to be cut 30 centered on a portion to be cut by the saw chain 6 which are important portions in the cutting operation can be effectively emitted. Note that, in an actual situation, there is no clear border as to what extent the emitting area of the light spreads, and therefore, the area indicated by the dotted lines 21c and 21d is consistently only rough indication, and the emission of the light does not necessarily become zero even outside the area indicated by the dotted lines.

Figure 4:
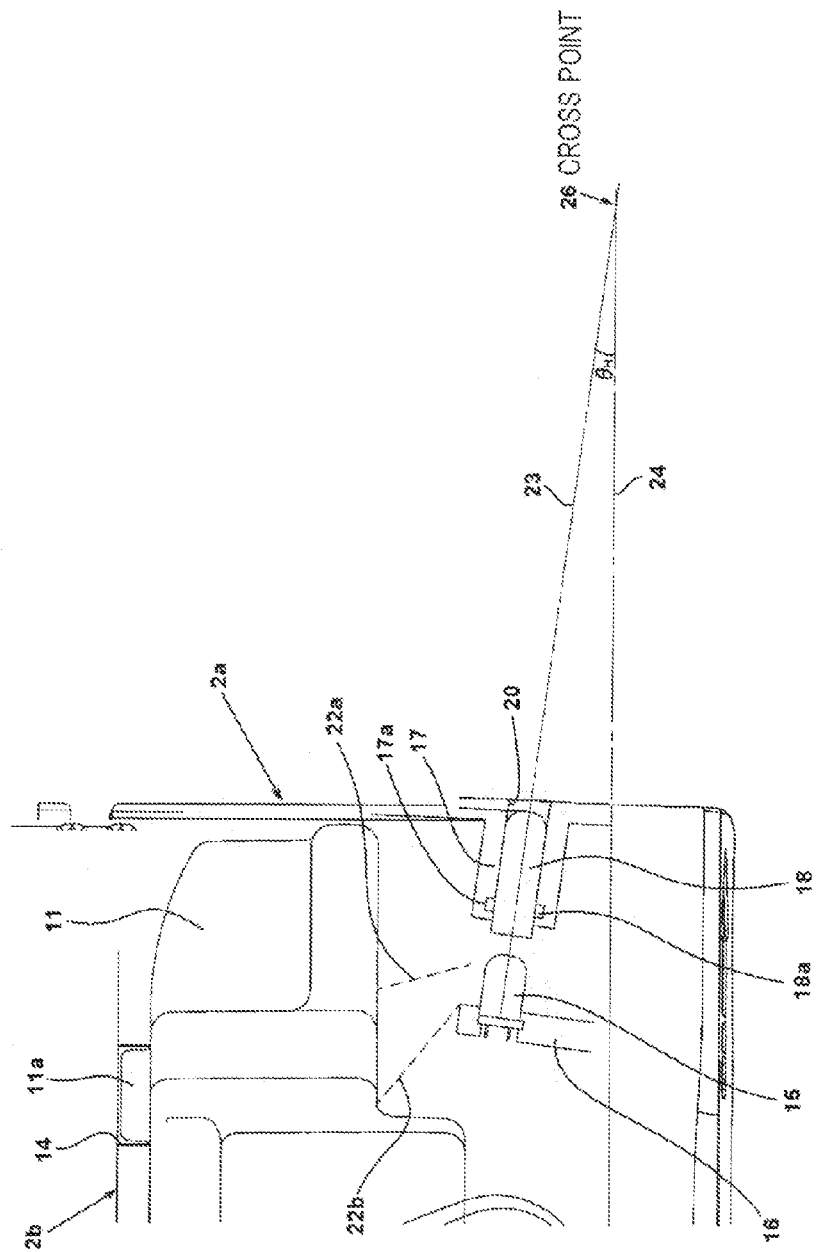
FIG. 4 is a partially-enlarged view for explaining a detail of an attaching relationship between an LED 15 and a prism 18 of FIG. 3.

FIG. 4 is a partially-enlarged view for explaining a detail of an attaching relationship between the LED 15 and the prism 18 of FIG. 3. The LED (Light Emitting Diode) 15 is, for example, a white-color light emitting diode, which has a light weight and is durable against impact, and besides, has a long life as different from those of a light bulb since no filament is used. The LED 15 is configured by a light emitting unit, a transparent resin portion housing the light emitting unit, and two terminals (cathode and anode) extending from the light emitting unit. While there are various shapes of the transparent resin portion, the portion is formed in an artillery shape (hemispherical dome shape) in the present embodiment. The LED 15 is fixed to an attachment base 16 extending from an inner wall portion of the housing 2. It is preferred that the attachment base 16 is manufactured as integrally molded with the housing 2 that is molded with polymer resin. An optical axis 23 of the LED 15 is attached so as not to be completely coincident with the front/back direction of the chainsaw 1 but so as to be tilted by a predetermined angle $\theta_H$ rightward in view from above as illustrated in FIG. 4 with an offset.

On the front side of the LED 15, the prism 18 having a cylindrical shape is provided. A protruding portion 18a is provided at each of two positions in vicinity of a back end of the prism 18. By fitting the protruding portions 18a of the prism 18 to concave portions 17a of an attachment rib 17 formed so as to protrude from the inner wall of the housing 2, the prism 18 is fixed to the attachment rib 17. Also, a housing portion of the attachment rib 17 for the prism 18 is formed as a cylindrical through hole 20. The prism 18 functions as a light guiding member that allows the light emitted from the LED 15 and entering into the prism 18 to be emitted frontward from the prism 18 so as to have a predetermined spread angle. Further, in the present embodiment, the through hole 20 is closed by the prism 18 so that the prism 18 also functions as a protection member or a cover member for preventing enter of dust from the outside into the housing 2 through the through hole 20. While a material of the prism 18 is any material as long as it has a good transmitting performance and a good light distribution performance, for example, a plastic prism made of polyester resin may be used.

Note that it is preferred to arrange a cross point 26 between the optical axis (axial line of the light) 23 and a saw-chain rotational plane 24 inside a rotation area of the saw chain 6. That is, when the cross point 26 is arranged so as to be further back than the most front end of the saw chain 6, this arrangement is preferred because a portion required for the operation is efficiently illuminated. On the other hand, not all the light emitted from the LED 15 enter into the prism 18, but a part thereof is emitted onto also the oil tank 11 side as indicated from a dotted line 22a to a dotted line 22b. In the white-color light emitting diode in recent years, it has a sufficient luminance in spite of low power consumption, and therefore, sufficient light quantity for checking the state of the oil tank 11 can be obtained by even using leakage light leaked sideward from the artillery-shape transparent resin portion. Note that, in order to obtain such illumination characteristics, the shape of the transparent resin portion of the LED 15 may be not the artillery shape but other shape or a form in which a cap for diffusing the light is put thereon.

The oil tank 11 is a transparent or semitransparent container made of polymer resin, and transparent or semitransparent chain oil is stored therein. That is, the oil tank 11 is made of a transparent or semitransparent material, and the chain oil to be supplied to the saw chain 6 is stored therein. An oil observation window 14 is provided on a part of a left side surface 2b of the housing 2 which is on a left side of the oil tank 11. That is, the oil tank 11 is provided so that at least a part thereof is visually checkable from the outside of the housing 2. Note that the oil observation window 14 may be formed as a cut-out portion of the housing 2 which is elongate in the vertical direction. In the present embodiment, a convex portion 11a obtained by shaping a part of the oil tank 11 into a convex shape is fitted to the oil observation window 14. Here, as seen from FIG. 4, the light emitted from the LED 15 in the area from the dotted line 22a to the dotted line 22b transmits through the oil tank 11 and the chain oil (not illustrated) filled therein, and reaches the convex portion 11a. As a result, when the worker looks inside the oil observation window 14, the worker can easily check whether or not the chain oil is filled up to a corresponding portion to the oil observation window 14 of the oil tank 11 with a state illuminated by the LED 15 from the back side of the oil tank 11. More particularly, when a liquid level of the chain oil is positioned between a top end position of the oil observation window 14 and a bottom end position thereof, the liquid level of the chain oil is visible well because of the light from the LED 15, and therefore, the checking is easy.

As described above, in the present embodiment, since the LED 15 is arranged in the position between the oil tank 11 and the right side wall of the housing 2, which is in the vicinity of the right side of the oil tank 11, and therefore, the light from the LED 15 can be effectively emitted to the oil tank 11. That is, the LED 15 is provided in the vicinity of the side surface of the oil tank 11 which is opposite to the oil observation window 14, and therefore, the light from the LED 15 is directly emitted to the oil tank 11, and also transmits through the oil tank 11 to be guided to the oil observation window 14. Note that the position at which the LED 15 is provided is not limited to only the vicinity on the right side of the oil tank 11. Since the present embodiment is structured so that the presence of the chain oil is checked by using the transmitted light, the oil tank 11 is provided on a straight line connecting the oil observation window 14 to the LED 15. However, as long as the same positional relationship as this can be maintained, the LED 15 may be provided at any position inside the housing 2. Also, in the present embodiment, the transmitted light from the LED 15 which transmits through the oil tank 11 is used. However, it may be structured so that the state of the chain oil can be checked by not the transmitted light but light reflected on the oil tank 11 and an inner wall of the housing 2. In this case, the LED 15 may be provided in an inner space of the housing 2 on not the right side surface of the oil tank 11 but the left side surface thereof or other position.

In the present embodiment, the saw chain 6 and the oil tank 11 are illuminated with the single LED 15 provided as the illumination unit. However, an LED for emitting the light to only the oil tank 11 and an LED for emitting the light to the front side of the housing 2 may be separately provided. The type of the LED 15 is not limited to the light emitting diode having the artillery-shape package made of the polymer resin, and may be a light emitting diode having other arbitral-shape package as long as light sufficient for illuminating the oil tank 11 can be emitted as indicated from the dotted line 22a to the dotted line 22b.

Figure 5:
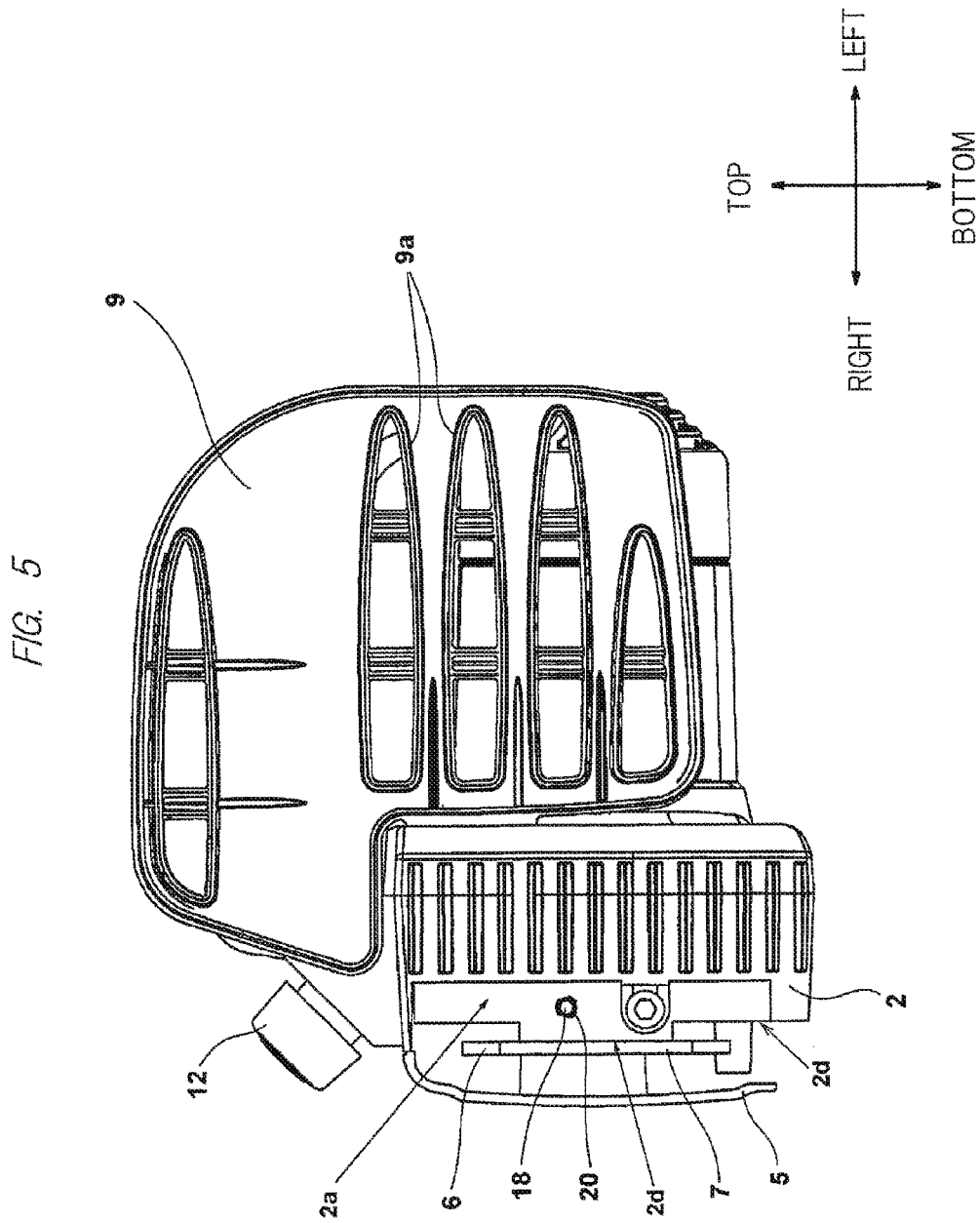
FIG. 5 is a front view of the chainsaw 1 according to the embodiment of the present invention.

FIG. 5 is a front view of the chainsaw 1 according to the embodiment of the present invention. As seen from this drawing, the guide bar 7 is attached to a right side surface 2c of the housing 2, and a right side of an attachment portion thereof is covered with the cover 5. The through hole 20 is provided at a part of a front wall 2a of the housing 2, and the prism 18 is attached inside. The position at which the through hole 20 is provided is on the left side of the guide bar 7, which is relatively close to the guide bar 7. The hand guard 9 is positioned on the left side (of the front wall 2a close to the rotational plane of the saw chain 6) of the front side of the chain saw 1 and the periphery of the upper side thereof. The hand guard 9 is manufactured by integrally molding polymer resin such as plastic, and a cut-out portion 9a is provided on a part thereof for weight saving.

Figure 6:
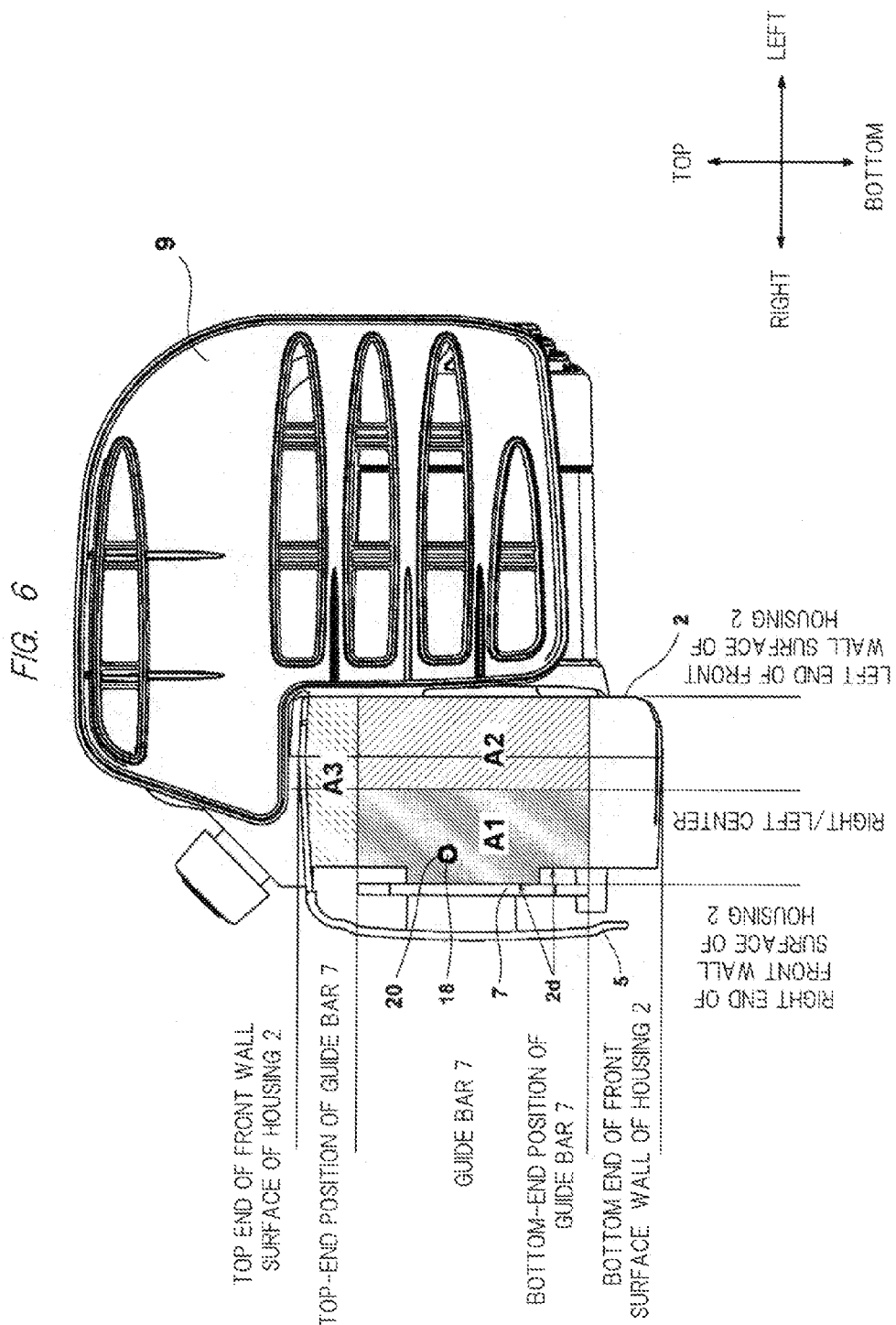
FIG. 6 is a front view of the chainsaw 1 according to the embodiment of the present invention, which is a view for explaining a positional relationship of a through hole 20.

Next, with reference to FIG. 6, the arrangement position of the through hole 20 will be explained. The light from the LED 15 serving as the illumination unit in the present embodiment is emitted through the prism 18 provided in the through hole 20. Subjects of the emission are the saw chain 6 wound around the guide bar 7 and a cutting portion of the subject to be cut 30. In the cutting with using the chainsaw 1, the cutting operation is performed in a bottom portion of the saw chain 6, and therefore, it is preferred that the light is emitted to the saw chain 6 in the vicinity of the cutting position and the subject to be cut 30 positioned in the vicinity thereof (see FIG. 2). In the present embodiment, as an arrangement position of the prism 18 at which an ideal illumination condition is satisfied, it is set that an arrangement position of the through hole 20 is above a lower end position of the guide bar 7, and besides, on a more-left side (that is, on a more-left side than the guide bar 7) than a right end of the front wall surface of the housing 2 as illustrated in FIG. 6. That is, it is set that the arrangement position of the through hole 20 with respect to the front wall 2a is on an upper side than a lower blade of the saw chain 6, and besides, on a more-left side than the rotational plane 24 of the saw chain 6. Since the through hole 20 is provided to the housing 2 in the present embodiment, candidate positions that satisfy these conditions are indicated by diagonal lines (shaded areas) A1, A2, and A3. The through hole 20 may be arranged at any one of these positions. However, more particularly, it is preferred to arrange the through hole 20 on a lower side than the upper end position of the guide bar 7 on the front wall surface of the housing 2, that is, at the positions indicated by the diagonal lines A1 and A2. More preferably, it may be arranged on a more-right side than a right/left center of the front wall surface of the housing 2, that is, on the position indicated by the diagonal line A1. By arranging it as described above, the light can be evenly emitted to the guide bar 7 and the saw chain 6 from the vicinity of the back end to the vicinity of the front end thereof, and besides, it can be emitted well to the cutting position of the subject to be cut 30.

Figure 7:
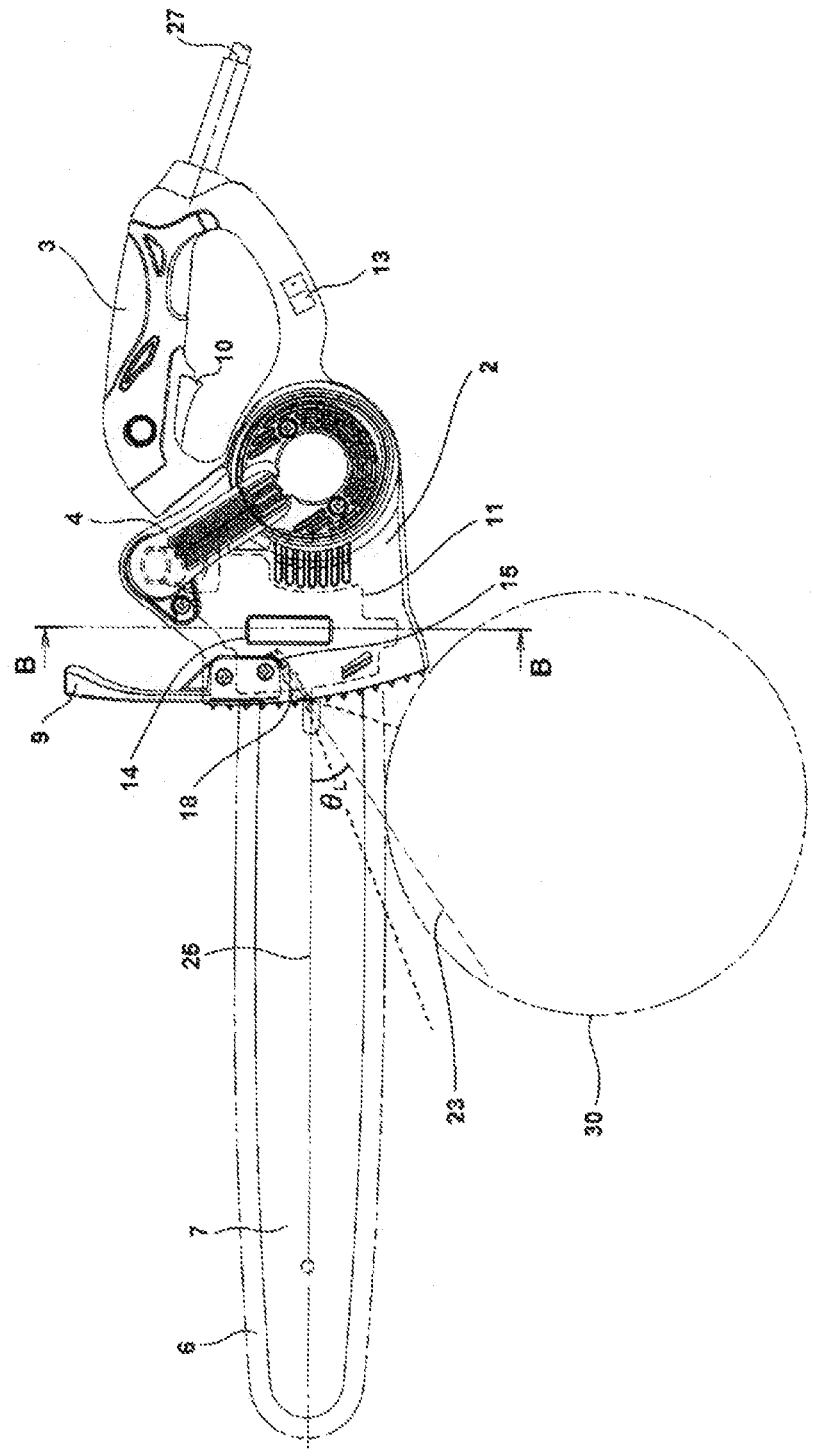
FIG. 7 is a left side view of the chainsaw 1 according to the embodiment of the present invention.

FIG. 7 is a left side view of the chainsaw 1 according to the embodiment of the present invention. As seen from this drawing, it could be understood that the oil observation window 14 having a longitudinally-elongated rectangular shape is provided on the left side of the housing 2. Also, in this drawing, a shape and arrangement of the oil tank 11 are indicated by dotted lines. When viewed from the side surface, the LED 15 is provided at the almost same position as that of the oil observation window 14 which is on the opposite side thereto so as to sandwich the oil tank 11 therebetween. The optical axis 23 of the LED 15 is arranged downward by an angle $\theta_L$ with respect to a top/bottom centerline 25 of the guide bar 7 in the side surface view. Therefore, the direction of the LED 15 and the arrangement of the prism 18 in the longitudinal direction are adjusted in accordance with the optical axis 23. That is, as illustrated in FIGS. 4 and 7, it is set that the optical axis 23 of the LED 15 is directed more downward than the top/bottom centerline 25, that is, more downward than a horizontal plane, and besides, in a direction of crossing the rotational plane 24 of the saw chain 6. The LED 15 is turned on or off by an LED switch 13 provided on a backside lower portion of the housing 2. An attachment position of the LED switch 13 is not limited to a position illustrated in FIG. 7, but may be provided at other any position such as an upper portion of the main handle 3.

Figure 8:
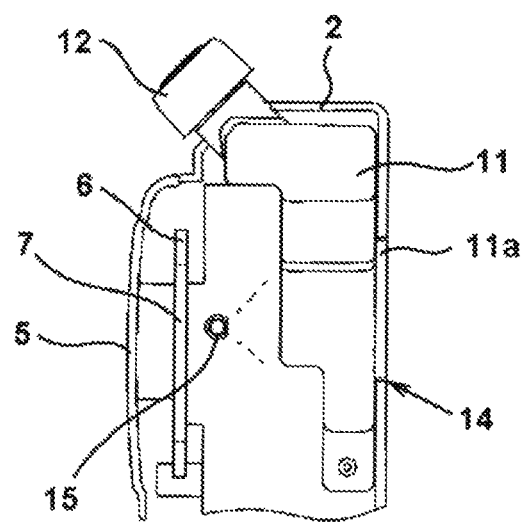
FIG. 8 is a cross-sectional view taken along a line B-B of FIG. 7.

FIG. 8 is a cross-sectional view taken along a line B-B of FIG. 7. In this cross-sectional position, the oil tank 11 has a complicated shape in order to avoid a driving mechanism for driving the saw chain 6, which is not illustrated. The LED 15 is provided in vicinity of the oil tank on the right side of the oil tank 11. Note that the LED 15 can be brought to the left side more so as to be closer to the oil tank 11. However, by separating them away from each other by a distance to some extent, the light emitted from the LED 15 is sufficiently diffused as indicated by dotted lines during the reach to the oil tank 11, and therefore, the light can be emitted to the oil tank 11 in a wider area. In this manner, when the worker looks inside the oil observation window 14 from the outside of the housing 2, the remaining amount of the chain oil can be easily checked because the oil observation window 14 is evenly illuminated.

As explained above, according to the embodiment of the present invention, the oil tank 11 can be illuminated from the inside of the housing 2 by using the LED 15, and as a result, the worker can easily visually check the presence of the chain oil when the worker looks through the oil observation window 14, and therefore, a chainsaw for which an inspection operation is very easy can be achieved. Also, according to the present embodiment, the LED 15 is embedded in the chainsaw 1, the cutting operation portion performed by the saw chain 6 can be illuminated well by the emitted light from the LED 15, and therefore, the saw chain 6 and a positional relationship of wood or others therewith to be cut can be easily visually checked. In such an arrangement, by turning the LED 15 on, the cutting operation can be easily performed even in a dark location such as nightfall, and therefore, the working efficiency can be improved. Further, since the LED 15 is provided to the chainsaw 1, the cutting operation efficiency in the dark location can be improved without preparing an illuminating device such as a projector or a helmet with an illuminating device separately from the chainsaw 1. Also, when the cutting operation portion is illuminated by using the illuminating device such as the projector or the helmet with the illuminating device, it is thought up that the worker blocks the light from the illuminating device depending on the working posture. However, since the LED 15 is provided to the chainsaw 1, the cutting operation portion can be illuminated well without influence from the working posture. Further, since both of the oil tank 11 and the cutting operation portion by the saw chain 6 are illuminated by one LED 15, increase in the manufacturing cost of the chainsaw 1 can be suppressed. Still further, since the LED 15 is provided inside the housing 2, the light reaching from the LED 15 to the oil tank 11 is not blocked by a hand, arm, or others of the worker.

Embodiment 2

Figure 9:
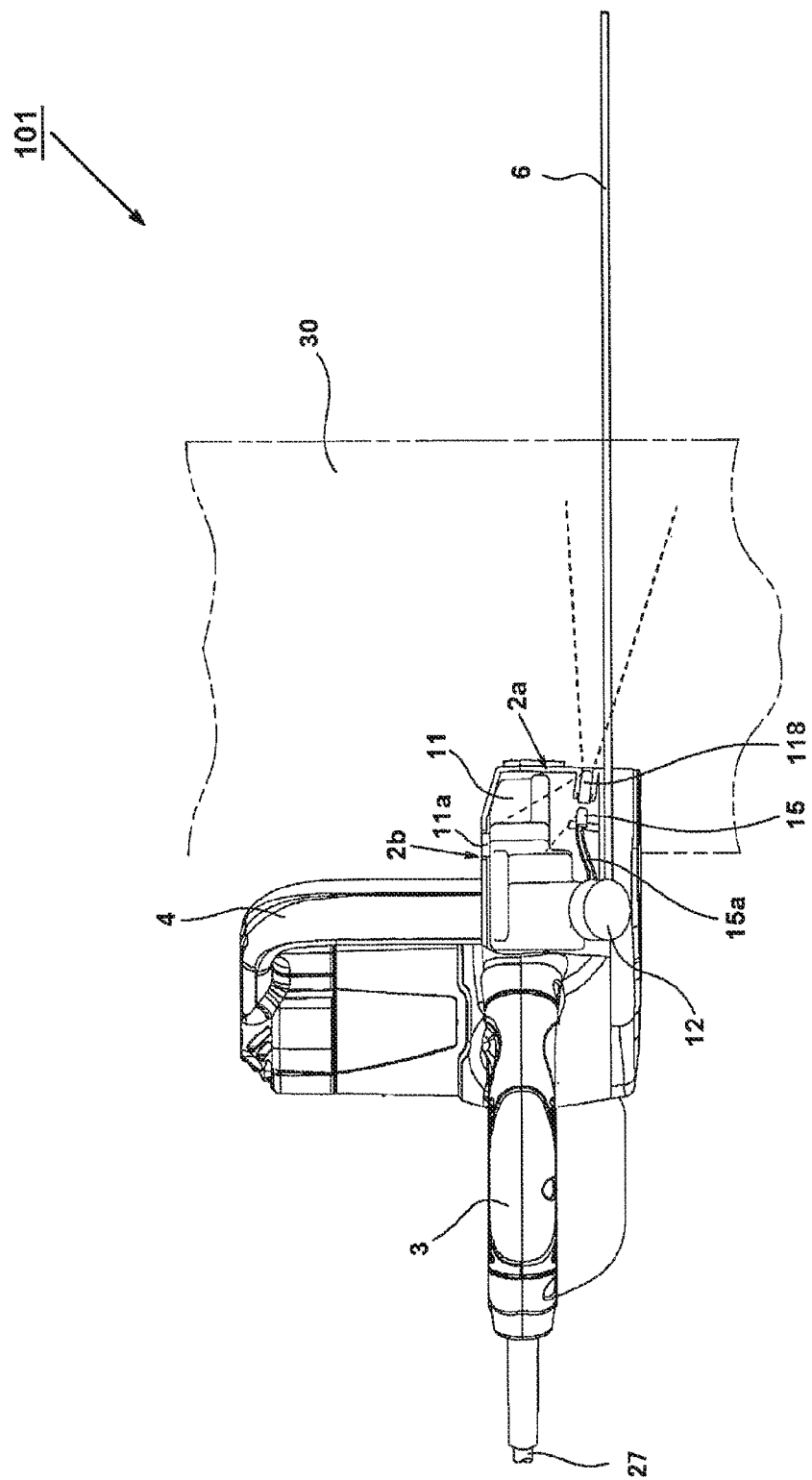
FIG. 9 is a top view of a chainsaw 101 according to a second embodiment of the present invention.

Next, with reference to FIG. 9, a second embodiment of the present invention will be explained. The second embodiment is the same as the first embodiment in that the LED 15 is used as the illumination unit and in that a prism 118 is provided as a light guiding member and a cover member. The LED 15 is configured by a light emitting unit, an artillery-shape transparent resin portion housing the light emitting unit, a base, and two terminals (cathode and anode) extending from the base. The two terminals are connected by a lead line 15a to a power source unit not illustrated.

In the second embodiment, the prism 118 is configured so as not to allow all the incident light from the LED 15 to be emitted onto the saw chain 6 side, but to allow a part of the light to reflect (or refract) and be emitted toward the oil tank 11. In this manner, by effectively utilizing characteristics of the light contained in the prism on which the light diffuses, refracts, and reflects, a desired quantity of the light can be guided onto the oil tank 11 side with using the function of the prism 118 even if the LED (light emitting diode) 15 that is insufficient as the illumination unit in the quantity of light leaking in a lateral direction is used. Also, by emitting the light onto the oil tank side 11 in the prism 118, the degree of freedom in the arrangement position of the LED 15 is increased, so that the LED 15 can be efficiently arranged inside even a narrow housing 2. An emitting area of the light emitted from the prism 118 to the outside of the housing 2 may be the same as that of the first embodiment.

As described above, in the second embodiment, the same effect as that of the first embodiment can be achieved. Also, by using the LED 15 as the illumination unit, a part of energy of supplied electric power which is externally wastefully released as heat can be saved, and waste power consumption can be prevented. Further, when the worker removes stains from the LED 15, the worker can easily perform the operation because it is not hot as different from an electric light bulb. Still further, by operating the LED switch 13 by the worker, such an operation as not to turn on the LED 15 when not required is achieved, and therefore, power for lighting on the illumination unit can be saved. Note that the prism is used as the light guiding member in the second embodiment. However, other means such as a reflector or an optical fiber may also be used.

In the foregoing, the present invention has been concretely described based on the embodiments. However, the present invention is not limited to the foregoing embodiments and various modifications and alterations can be made within the scope of the present invention. For example, in the above-described embodiments, the LED is used as the illumination unit. However, it is not limited to only the LED, and a small-size light bulb, an EL (electro luminescence) panel, an EL sheet, or other any light emitting device may be used as the illumination unit. Also, in the above-described embodiments, the saw chain driven by the electric motor has been exemplified. However, the driving source is not limited to only the electric motor but may be a 2-cycle or 4-cycle engine. In this case, as the power source for the LED, an output from a generator in which power is generated by the rotation of the engine may be used, or a battery exclusively used for allowing the LED to emit light may be mounted. Further, as the power source for the electric motor, not only the commercial power source but also a chargeable battery pack such as a lithium ion battery may be used.

Hereinafter, each embodiment of a chainsaw and an effect obtained by each embodiment will be collectively described.

A chainsaw of one embodiment includes: a saw chain driven by a driving source such as a motor or an engine housed inside a housing; a guide bar attached to the housing so as to protrude frontward, which guides the rotation of the saw chain; and an oil tank housed inside the housing, in which chain oil to be supplied to the saw chain is stored, and the oil tank is made of a transparent or semi-transparent material, the oil tank is provided so that at least a part thereof is visually checkable from the outside of the housing, and an illumination unit for illuminating the oil tank is provided. In this manner, the remaining amount of the chain oil can be easily visually checkable even in a dark location, and therefore, the working efficiency can be improved.

In a chainsaw according to another embodiment, an oil observation window for checking the remaining amount in the oil tank from the outside of the housing is formed in the housing. In this manner, through the oil observation window, the remaining amount of the oil in the oil tank illuminated by the illumination unit can be easily visually checked.

In a chainsaw according to still another embodiment, the illumination unit is provided inside the housing, and the light emitted from the illumination unit is configured to transmit through the oil tank and leak to (reach) the outside of the housing through the oil observation window. Alternatively, the light emitted from the illumination unit is configured to be reflected by the surface of the oil tank or the oil and leak to (reach) the outside of the housing through the oil observation window. In this manner, the oil tank can be illuminated from the inside of the housing, and therefore, the presence of the oil can be easily checked through the oil observation window without blocking the light by the hand, arm, or others of the worker. Also, a risk of damage of the illumination unit due to collision during the operation can be eliminated.

In a chainsaw according to still another embodiment, the illumination unit is provided inside a front wall of the housing, and the illumination unit is configured to illuminate a part of the saw chain through a through hole formed on the front wall, and a part of the light emitted from the illumination unit illuminates the oil tank. In this manner, the illumination unit is used also as an illuminating device for illuminating a part of the saw chain through the through hole formed on the front wall of the housing, and therefore, the visibility on the saw chain and the periphery of the work area can be improved. Also, a part of the light emitted from the illumination unit is configured to illuminate the oil tank, and therefore, it is not required to prepare another illumination unit for the oil tank.

In a chainsaw according to still another embodiment, the illumination unit is prepared as the LED provided in the vicinity of the side surface opposite to the oil observation window in the oil tank. In this manner, the illumination unit is the LED, and therefore, the power consumption is small, and besides, the energy externally wastefully released as the heat can be significantly saved. Also, since the LED is provided in the vicinity of the side surface opposite to the oil observation window in the oil tank, the light emitted from the LED can efficiently reach the oil observation window.

In a chainsaw according to still another embodiment, a part of the light emitted from the LED is configured to be directly emitted to the oil tank. Also, a part of the light emitted from the LED is configured to be reflected by a mirror, a prism, or other light guiding member and is emitted to the oil tank. In this manner, since the part of the light emitted from the LED is directly emitted to the oil tank or is reflected and emitted thereto, not only the periphery of the saw chain but also the oil tank can be widely illuminated by one LED.

In a chainsaw according to still another embodiment, a cover member in which the light transmits is provided to a through hole formed on the front wall of the housing. In this manner, since the cover member is provided to the through hole, dusts do not enter inside through the through hole, and the damage of the illumination unit due to hit with the wood piece or others can be prevented.

In a chainsaw according to still another embodiment, the cover member is configured as a light guiding member such as a prism in which the light transmits and which guides the light in a predetermined direction. In this manner, since the cover member is the light guiding member in which the light transmits and which guides the light in the predetermined direction, the light can be effectively guided in a desired direction to be emitted.

In a chainsaw according to still another embodiment, the light guiding member is configured as a prism on which a part of the incident (entering) light reflects or refracts toward the oil tank and in which the rest of the light transmits. In this manner, since the prism is used as the light guiding member, the light can be effectively emitted in a target direction. Also, by reflecting or refracting the incident light, the light effectively disperses toward the oil tank side. Further, since the light guiding member is the prism on which the part of the incident light reflects or refracts toward the oil tank and in which the rest of the incident light transmits, the light emitted from the LED can be branched to be guided toward the oil tank and the saw chain by a simple configuration.

In a chainsaw according to still another embodiment, the through hole is arranged at a position of the front wall of the housing, which is on the upper side than the lower blade of the saw chain, and besides, on the more-left side than the rotational plane of the saw chain. In this manner, by arranging the through hole, the illumination unit can be provided at a convenient position for both of the emission to the oil observation window provided on the lateral of the housing often and the emission to the saw chain.

In a chainsaw according to still another embodiment, the axial line of the light emitted from the through hole is set in a direction which is slightly lower than the horizontal plane, and besides, which crosses an extended plane including the rotational plane of the saw chain. In this manner, by setting the axial line of the light, the emitted position is adjusted to a line-of-sight position of the worker (who visually diagonally checks from an upper left side), and therefore, effective emission by the illumination unit can be achieved.

REFERENCE SIGNS LIST 1 chainsaw,
2 housing,
2a front wall (of housing),
2b left side surface (of housing),
2c right side surface (of housing),
2d motor cover portion (of housing),
3 main handle,
4 sub-handle,
5 cover,
6 saw chain,
7 guide bar,
9 hand guard,
9a cut-out portion,
10 switch,
11 oil tank,
11a convex portion,
12 oil cap,
13 LED switch,
14 oil observation window,
15 LED,
15a lead line,
16 attachment base,
17 attachment rib,
17a concave portion,
18 prism,
18a protruding portion,
20 through hole,
21 emitted light,
23 optical axis,
24 rotational plane of saw chain,
25 top/bottom centerline,
26 cross point,
27 power source cord,
30 subject to be cut,
101 chainsaw,
118 prism

The invention claimed is:
1. A chainsaw comprising:
a saw chain driven by a driving source housed inside a housing;
a guide bar attached to the housing so as to protrude frontward, which guides rotation of the saw chain; and
an oil tank housed inside the housing, in which chain oil to be supplied to the saw chain is stored, wherein the oil tank is made of a transparent or semi-transparent material, the oil tank is provided so that at least a part thereof is visually checkable from outside of the housing, an illumination unit for illuminating the oil tank is provided inside the housing, and the illumination unit is configured to emit light to simultaneously illuminate the oil tank and a part of the saw chain, part of the light to be emitted from the illumination unit being transmitted through the oil tank, or reflected by the oil tank, to reach an outside from a lateral side of the housing, and another part of the light being transmitted toward the saw chain from a front side of the housing.

2. The chainsaw according to claim 1, wherein an oil observation window for checking a remaining amount in the oil tank from the outside of the housing is formed in the housing.

3. The chainsaw according to claim 2, wherein the oil tank is arranged between the illumination unit and the oil observation window, and the illumination unit is an LED provided in vicinity of a side surface of the oil tank.

4. The chainsaw according to claim 3, wherein a part of light emitted from the LED is directly emitted to the oil tank or is reflected and emitted thereto.

5. The chainsaw according to claim 1, wherein the illumination unit is provided inside a front wall of the housing, and illuminates a part of the saw chain through a through hole formed on the front wall, and a part of the light emitted from the illumination unit illuminates the oil tank.

6. The chainsaw according to claim 5, wherein a cover member in which the light transmits is provided to the through hole formed on the front wall.

7. The chainsaw according to claim 6, wherein the cover member is a light guiding member in which the light transmits and which guides the light in a predetermined direction.

8. The chainsaw according to claim 7, wherein the light guiding member is a prism on which a part of incident light reflects or refracts toward the oil tank and in which the rest of the incident light transmits.

9. The chainsaw according to claim 5, wherein the through hole is arranged at a position of the front wall of the housing, which is on an upper side than a lower blade of the saw chain, and besides, on a more-left side than a rotational plane of the saw chain.

10. The chainsaw according to claim 5, wherein an axial line of the light emitted from the through hole is set in a direction which is slightly lower than a horizontal plane, and besides, which crosses a rotational plane of the saw chain, and the horizontal plane is a plane extending in a front/back direction of the chainsaw, the plane crossing the rotational plane of the saw chain.

* * * * *